United States Patent
Holan et al.

(10) Patent No.: US 12,515,973 B1
(45) Date of Patent: Jan. 6, 2026

(54) SCALE TREATMENT IN GEOTHERMAL OR EXTREMELY HIGH TEMPERATURE WELLS

(71) Applicant: Halliburton Energy Services, Inc., Houston, TX (US)

(72) Inventors: Kristina Henkel Holan, Houston, TX (US); Enrique Antonio Reyes, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/913,243

(22) Filed: Oct. 11, 2024

(51) Int. Cl.
*E21B 37/06* (2006.01)
*C02F 5/10* (2023.01)
*E21B 43/28* (2006.01)

(52) U.S. Cl.
CPC .............. *C02F 5/105* (2013.01); *E21B 37/06* (2013.01); *E21B 43/28* (2013.01)

(58) Field of Classification Search
None
See application file for complete search history.

(56) References Cited

U.S. PATENT DOCUMENTS

| | | | |
|---|---|---|---|
| 9,127,194 B2 | 9/2015 | Reyes | |
| 9,512,348 B2 | 12/2016 | Reyes et al. | |
| 10,005,950 B2 | 6/2018 | Smith et al. | |
| 10,138,560 B2 | 11/2018 | Reyes et al. | |
| 10,563,115 B2 | 2/2020 | Salla et al. | |
| 10,577,535 B2 | 3/2020 | Reddy et al. | |
| 11,505,738 B2 | 11/2022 | Beuterbaugh et al. | |
| 11,661,545 B2 | 5/2023 | Zakaria | |
| 2005/0123437 A1* | 6/2005 | Cassidy | C23F 11/04 422/12 |
| 2009/0221455 A1* | 9/2009 | Ke | C09K 8/54 507/261 |
| 2013/0210686 A1* | 8/2013 | Augsburger | C09K 8/528 507/267 |
| 2016/0280989 A1* | 9/2016 | Reyes | E21B 43/28 |
| 2020/0362227 A1* | 11/2020 | Obot | C09K 8/54 |
| 2022/0106862 A1* | 4/2022 | Bin Omar | E21B 43/16 |
| 2022/0389305 A1* | 12/2022 | Zakaria | C09K 8/572 |

OTHER PUBLICATIONS

Spe, Zakaria, et al. Next Generation Acid System—Deep-Penetrating Non-Corrosive Fluid for High Temperature Sandstone Stimulation, SPE-210381-MS, Sep. 26, 2022.
Baker Hughes, Baker Hughes unveils innovative Thermastim Technology for Geothermal energy to unlock full well potential, Nov. 29, 2023.

* cited by examiner

*Primary Examiner* — Andrew Sue-Ako
(74) *Attorney, Agent, or Firm* — Thomas Rooney; Tumey Law Group PLLC

(57) ABSTRACT

Disclosed herein are methods and systems for treating geothermal wells. The methods include introducing a treatment fluid into a wellbore of a geothermal well having geothermal scale, contacting the geothermal scale with the treatment fluid, and removing at least a portion of the geothermal scale from the geothermal well using the treatment fluid. The treatment fluid comprises an ester, a fluoride-containing source, and a base fluid, wherein a molar ratio of fluoride-containing source to ester is about 1:1 to about 5:1. The methods may also be applied to matrix acidizing.

16 Claims, 3 Drawing Sheets

SCALE TREATMENT IN GEOTHERMAL OR EXTREMELY HIGH TEMPERATURE WELLS

BACKGROUND

Treatment fluids may be used in a variety of subterranean treatment operations including drilling operations, stimulation operations, production operations, remediation operations, sand control treatments, and scale dissolution and removal operations, for example. Scale deposits or "scaling" can represent a challenge during various subterranean operations. Equally, in extremely high temperature wells (e.g., bottomhole static temperature (BHST) in excess of 400 F), the removal or dissolution of silica or aluminosilicate material may be necessary to propagate fluid placement into and within the reservoir and thereby facilitate the extraction of energetic resource. In production wells, such as those producing a hydrocarbon resource or a high enthalpic liquid such as a geofluid, scale deposits can decrease a subterranean formation's permeability and lessen its production capacity and/or rate while in injection wells the continuous introduction of water or aqueous fluids may lead to scaling in the near wellbore area. Silica scales can be particularly problematic in this regard due to the extreme insolubility of silica and certain silicate species. Hydrofluoric acid or a hydrofluoric acid-generating compound are generally needed to remove silica scale as well as aluminosilicates. Various silica scale control additives are also available to limit the initial deposition of silica scale.

Scaling can be an especially problematic issue in geothermal wells and their associated equipment. As used herein, the term "geothermal well" refers to a well structure that establishes a fluid connection between a geothermal fluid and the earth's surface. As used herein, the term "geothermal fluid" refers to a formation fluid that is heated within a subterranean formation by a geothermal heat source. Geothermal fluids can be liquids or gases, such as geothermal brines or geothermal steam. Although geothermal fluids can represent a source of clean energy once they are brought to the earth's surface and transformed into electrical power, they can dissolve high concentrations of a wide range of chemical components, particularly metal compounds, at the fluids' high initial downhole temperatures. The dissolved components can present a number of difficulties, as discussed hereinafter.

As geothermal fluids exit the geothermally heated portion of the subterranean formation and cooling occurs, the solubility limit of the dissolved components can be exceeded, and geothermal scale can form. If deposits of geothermal scale are not removed or prevented from forming, a number of deleterious consequences may result, including plugging of the well annulus, pipes, or the formation porosity as well as of the pipe conduits and tubulars. Scale-induced damage to downhole tools and surface equipment may also render the tools and equipment inoperative. Corrosion of metal goods in contact with a geothermal fluid can also present an additional difficulty, when the scale build-up requires the use of highly aggressive or corrosive dissolving fluids or when the scale itself leads to electrochemical imbalances in the metallic structures. Furthermore, geothermal scale can impact the efficiency of heat exchangers used to withdraw thermal energy from the geothermal fluid, thereby decreasing the fluid's capacity for energy production. The density and low surface area of geothermal scale can often make it difficult to achieve sufficient chemical interaction with a treatment fluid in order to promote scale dissolution. In addition, the chemical complexity and variability of geothermal scale can make it difficult to develop a suitable descaling treatment protocol.

One example of a descaling fluid presently in use for removal of geothermal scale is a mixture of hydrochloric acid and hydrofluoric acid. However, this descaling fluid presents significant corrosion issues itself and can be costly to dispose of once spent. In addition, significant cooling of the geothermal well is often required to support its use, again adding to the treatment time and costs. As an alternative to chemical methods, physical removal of geothermal scale may also be conducted (e.g., by techniques such as scraping, scratching, reaming, hydrojetting, pulverizing or the like), but these techniques can be problematic to implement downhole and may mechanically damage downhole components if not performed carefully.

BRIEF DESCRIPTION OF THE DRAWINGS

These drawings illustrate certain aspects of some examples of the present disclosure and should not be used to limit or define the disclosure.

DETAILED DESCRIPTION

Figure 1:
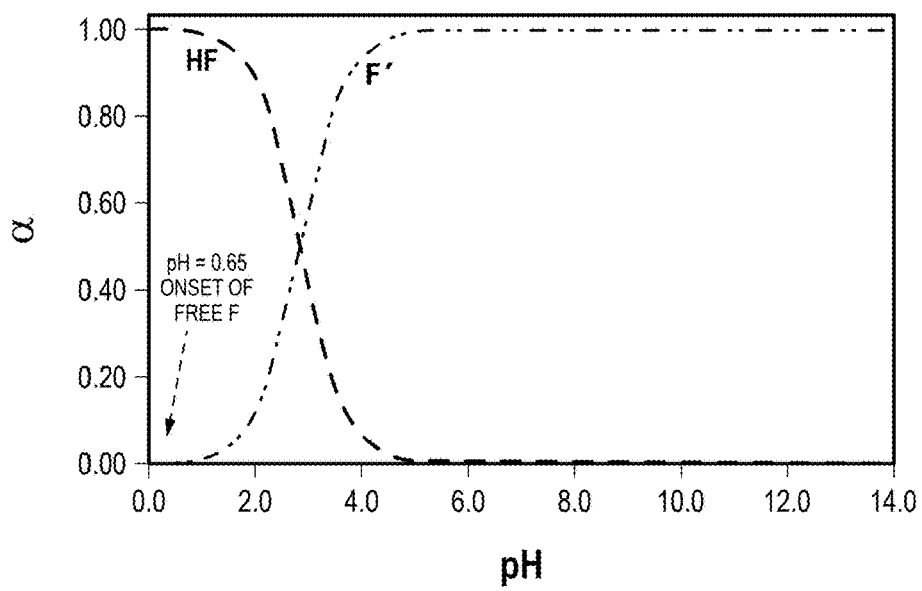
FIG. 1 represents the distribution of HF species as a function of the pH of the solution at room temperature.

The present disclosure generally relates to geothermal wells, and, more specifically, to systems and methods for removing geothermal scale formed from a source of geothermal fluid. In embodiments, the treatment fluid comprises at least an ester and a fluoride containing source in a base fluid. The molar ratio of fluoride containing source to ester may be important to have a nearly non-corrosive fluid in which the pH of the treatment fluid may be between about 5.5 to about 8. The molar ratio of concentrations of the fluoride containing sources to the ester may be from about 1:1 to about 5:1. This range of pH may impact the corrosion inhibition of the treatment fluid in contact with metal components, be safer to handle (especially as compared to system with pH below 4), minimize waste generation, and optimal for scale dissolution. Further, it should be noted that no activator, breaker, or oxidizer is needed in this treatment fluid.

In embodiments, the treatment fluid may be introduced into a geothermal well having bottomhole temperature from about 350 F (177° C.) to about 600 F (315° C.) and having geothermal scale present. Even further while the methods disclosed in this application are directed to geothermal wells, they are also applicable to matrix acidizing of sandstone formation and/or extremely high temperature wells, i.e., wells having bottom hole static temperature (BHST) in excess of 400 F (204° C.).

The treatment fluid includes a base fluid which may be any brine. The term "brine" as used herein refers to various salts and salt mixtures dissolved in aqueous fluids. Brines suitable for use in some embodiments of the present invention may include those that comprise monovalent, divalent, or trivalent cations. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. A suitable brine may be seawater. The brine chosen should be compatible with the formation and should have a sufficient density to provide the appropriate degree of well control. Additional salts may be added to a water source, e.g., to provide a brine, and a resulting viscosified treatment fluid, having a desired density.

An advantage of using ammonium fluoride is that the brine is composed of ammonium ions which themselves originate from the fluoride source; alternatively, the use of ammonium bifluoride equally serves this purpose. Sodium or potassium fluoride salts, mono- or bi-, can also serve to satisfy both characteristics. Additionally, other cationic nitrogen salts such as tetraalkyl ammonium or polyquaternary ammonium may be used for the purpose of providing the counterion; however, in such case, there is a need for providing the requisite fluoride.

The treatment fluids of the present disclosure may vary widely in density. One of ordinary skills in the art with the benefit of this disclosure will recognize the particular density that is most appropriate for a particular application. In some embodiments, the density of the treatment fluids may approximate the density of water. In other embodiments, the density of the treatment fluids of the present invention may range from about 8.4 pounds per gallon ("ppg") to about 20.5 ppg. One of ordinary skill in the art with the benefit of this disclosure will recognize that the density of any particular treatment fluid of the present invention may also vary depending on the addition of certain additives, including, but not limited to, proppant, gas, fluid loss control additives, alcohols, glycols, and/or hydrocarbons. Furthermore, the desired density for a particular treatment fluid may depend on the characteristics of the subterranean formation, including, inter alia, the hydrostatic pressure required to control the fluids of the subterranean formation during placement of the treatment fluids, and the hydrostatic pressure which will damage the subterranean formation. For example, if the treatment fluid remains in the wellbore, the density of the treatment fluid may be adjusted to, inter alia, prevent the changing of position of a fluid relative to another fluid with a different density, thereby leaving the treatment fluid at the correct placement within the wellbore.

The treatment fluid of the present disclosure comprises at least an ester including any carboxylate ester, which has the general formula RCOOR' wherein R and R' are organic groups and R' is not a hydrogen atom. The carboxylate esters may be any aliphatic or aromatic esters. In embodiments, the carboxylate may be any water soluble or water miscible aromatic ester. In other embodiments, the carboxylate ester may be any carboxylate ester with a low molecular weight. The carboxylate may be selected from the group consisting of formate, acetate, lactate, oxalate, citrate, and any combination thereof. Examples of suitable aliphatic esters include ethyl acetate, methyl lactate, ethyl lactate, ethyl formate, isobutyl acetate, and isobutyl formate, or any combination thereof. Examples of suitable formate esters include ethylene glycol monoformate, ethylene glycol diformate, diethylene glycol diformate, glyceryl monoformate, glyceryl diformate, glyceryl triformate, triethylene glycol diformate, formate esters of pentaerythritol, methyl lactate, ethyl lactate, propane-1,2,3-triyl triacetate, glycerol triacetate, flycerin triacetate, 1,2,3-triacetylglycerol, 1,2,3-triacetoxypropane, or any combination thereof. Examples of cyclic esters include polylactides, lactones including oxetan-2-one (β-lactone), oxolan-2-one (γ-lactone), oxan-2-one (δ-lactone), oxepan-2-one (ε-lactone), or polyglycolides, and derivatives and combinations thereof.

In embodiments, the carboxylate is capable of forming a carboxylic acid in the presence of water. The formation of the carboxylic acid can occur via hydrolysis of the carboxylate and water, wherein the carboxylate gains a hydrogen atom from the water to form carboxylic acid. A common kind of hydrolysis occurs when a salt of a weak acid or weak base (or both) is dissolved in water. Water spontaneously ionizes into hydroxyl anions and hydrogen cations. The salt, too, dissociates into its constituent anions and cations. For example, sodium acetate dissociates in water into sodium and acetate ions. The sodium ions react very little with the hydroxyl ions; whereas the acetate ions combine with hydrogen ions to form acetic acid. The carboxylic acid can be, without limitation, a monocarboxylic acid or an alpha-hydroxy acid such as formic acid, acetic acid, lactic acid, oxalic acid, glycolic acid, or citric acid. The type of carboxylic acid formed will depend on the carboxylate selected. For example, if a formate is selected, then the carboxylic acid will be formic acid—if a citrate is selected, then the carboxylic acid will be citric acid, and so on.

In embodiments, the concentration of the ester is from about 0.25 mol/L to about 5 mol/L, from about 0.5 mol/L to about 4.5 mol/L, from about 0.75 mol/L to about 4 mol/L, from about 1.5 mol/L to about 3.5 mol/L, from about 2.0 mol/L to about 3 mol/L, or from about 1.0 mol/L to about 3.5 mol/L.

The treatment fluid of the present disclosure comprises any fluoride containing source including any hydrofluoric acid-generating compound as dissolution of siliceous materials are often promoted by hydrofluoric acid. The fluoride containing source may be hydrofluoric acid, ammonium fluoride, ammonium bifluoride, difluoroacetic acid, trifluoroacetic acid, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, titanium fluorides ($TiF_4$ and $TiF_6$, for example), bifluoride salts (ammonium bifluoride for example), perfluorinated organic compounds, boron trifluoride and boron trifluoride complexes, such as a boron trifluoride complex comprising at least one complex selected from the group consisting of boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, any derivative thereof, and any combination thereof.

In embodiments, the concentration of the fluoride containing source is from about 0.25 mol/L to about 6.8 mol/L, from about 0.5 mol/L to about 6.5 mol/L, from about 0.6 mol/L to about 6.0 mol/L, from about 0.7 mol/L to about 5.5 mol/L, from about 0.75 mol/L to about 5.0 mol/L, from about 1.0 mol/L to about 4.5 mol/L, from about 1.5 mol/L to about 4.0 mol/L, from about 2.0 mol/L to about 3.5 mol/L, from about 2.5 mol/L to about 3.0 mol/L, or from about 1.0 mol/L to about 5.0 mol/L. In some embodiments, a concentration of fluoride equivalent to 6.78 mol/L may be obtained if the volume of ammonium fluoride utilized is miscible or fully soluble with an ester source, and an additional volume of water is used. An example of such solution is given in Table 2 below.

In some embodiments, the molar ratio of the concentration of fluoride containing source to concentration of ester is from about 5:1 to about 1:1, from about 4:1 to about 2:1, from about 3:1 to about 1:1, from about 5:1 to about 5:3.5, from about 5:1.6 to about 5:3.5, or from about 5:3.15 to about 1:1. The treatment fluid of the present disclosure may have a dissolution capacity of 50% w/v of silica or above.

In embodiments, the treatment fluid is introduced into a wellbore of a geothermal well. The treatment fluid of the present disclosure may be especially effective when the geothermal well has a bottomhole temperature from about 350 F (177° C.) to about 600 F (315° C.), from about 400 F (204° C.) to about 500 F (260° C.), or any ranges in between.

In some embodiments, a corrosion inhibitor may be added to the treatment fluid when the treatment fluid is in contact with metallic component at temperatures above 400 F (204° C.) for an extended period of time such as from 10 minutes, 15 minutes, 20 minutes, 25 minutes, 30 minutes, 45 minutes, one hour, two hours or above, for example. The type of corrosion inhibitor and/or corrosion inhibitor intensifier and the loading depend upon the type of metal the treatment fluid will be in contact with, the contact time, the pH of the treatment fluid, and the temperature. For example, if a treatment fluid has a pH below 6 and is in contact with a metal susceptible to corrosion, a corrosion inhibitor may be needed even at a temperature ranging from 50 F (10° C.) to 110 F (43° C.). The metallic component may have a surface that is corrodible. As used herein, the term "corrodible" means capable of being corroded. As used herein, the term "metal alloy" means a mixture of two or more elements, wherein at least one of the elements is a metal. The other element(s) may be a non-metal or a different metal. The surface may be made of a corrosive metal or metal alloy such as copper, aluminum, zinc, nickel, chromium, tin, magnesium, manganese, molybdenum, platinum, titanium, lithium, phosphorous, silicon, or sulfur, and or alloys containing any of the foregoing metals, such as martensitic carbon steels and high- or low-alloy steels as defined in API 5CT "Specification for Casing and Tubing" and ISO 11960 "Petroleum and Natural Gas Industries-Steel Pipes for Use as Casing or Tubing for Wells", corrosion-resistant alloys (CRA) such as stainless steel, austenitic-ferritic (dual) steel, duplex stainless steel, austenitic alloys of the including nickel type, flexible tubing or coiled tubing, or titanium alloys (such as Grades 5, 7, 9, or 12, 17, 29 for example but not limited to), for example. An example of a metal and non-metal alloy is steel, comprising the metal element iron and the non-metal element carbon. An example of a metal and metal alloy may be bronze, comprising the metallic elements copper and tin. The corrodible surface is one in which corrosion can occur. The type of corrosion may be without limitation galvanic corrosion, pitting corrosion, microbial corrosion, high-temperature corrosion, crevice corrosion, stress cracking, or corrosion cracking, for example.

The corrosion inhibitor may include any inhibitor preventing or slowing the corrosion process derived from an alpha, beta-unsaturated aldehyde or an alpha, beta-unsaturated ketone with a primary, secondary, or tertiary amine including but not limited to diphenylmethyl piperidine, diphenyl amine, dibenzylamine or diisopropanolamine, hydroxyamines. Aldehydes such as cinnamaldehyde, benzaldehyde, crotonaldehyde are preferred and its corresponding Mannich bases, with an amine, but also including 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2-methylvinyl)]-2-n-octylethylene, dicinnamaldehyde, p-hydroxycinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S-N,N-dimethylcarbamoylthio)cinnamaldehyde, p-chlorocinnamaldehyde, 5-phenyl-2,4-pentadienal, 7-phenyl-2,4,6-heptatrienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, 3,7-dimethyl-2,6-octadienal, p-ethylcinnamaldehyde; p-methoxycinnamaldehyde; and mixtures thereof; quaternized heterocycles such as indole or quinoline, for example. Examples of quaternary ammonium compounds which may be included in the corrosion inhibitor compositions may be N-alkyl, N-cycloalkyl and N-alkylarylpyridintum halides such as N-cyclohexylpyridinum bromide or chloride, N-alkyl, N-cycloalkyl and N-alkylarylquinolinium halides such as N-dodecylquinolinium bromide or chloride, imidazolium; a quaternary ammonium compound selected from the group consisting of the N-methyl, N-benzyl and chloromethyl naphthalene quaternaries of alkyl pyridines and quinoline, benzoquinoline compounds and mixtures thereof, alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline compounds, isoquinoline quaternary salt, benzoquinoline quaternary salt, chloromethyl napthalene quaternary salt, and any combination thereof. Alternatively, a ketone such as acetophenone, benzylacetone, diphenylstyryl acetone or 1,1-diphenylacetone may also be employed instead or with the aldehyde.

Further, a corrosion inhibitor intensifier may be added including phosphorous salts such as those of halides, oxo-coordinated complexes, for example. More specific examples include cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of formic acid and/or potassium iodide. Iodide salts may be selected from lithium iodide, sodium iodide, potassium iodide, calcium iodide, magnesium iodide, ammonium iodide, tetramethylammonium iodide, tetrapropylammonium iodide, tetrabutylammonium iodide, tetrapentylammonium iodide, tetrahexylammonium iodide, tetraheptylammonium iodide, tetraphenylammonium iodide, phenyltrimethylammonium iodide and (ethyl) triphenyl phosphonium iodide; salts of antimony or bismuth including $Sb^{5+}$, $Sb^{3+}$, $Bi^{3+}$, $Bi^{5+}$, $Se^{4+}$, such as oxohalide and its higher isomers or congeners; other halides, sulfides, selenides, phosphides, nitrites or nitrates, for example. A group 15 metal source is chosen from the group consisting of antimony trioxide; antimony tetraoxide; antimony pentoxide; an antimony halide compound; antimony trichloride; antimony pentachloride; antimony trifluoride, antimony pentafluoride; antimony tartrate; antimony citrate; an alkali metal salt of antimony tartrate; antimony citrate; potassium pyroantimonate; an antimony adduct of ethylene glycol; a bismuth oxide compound; bismuth trioxide; bismuth tetraoxide; bismuth pentaoxide; a bismuth halide; bismuth trichloride; bismuth tribromide; bismuth triiodide; bismuth tartrate; bismuth citrate; an alkali metal salt of bismuth tartrate, an alkali metal salt of bismuth citrate; a bismuth oxyhalogen; and mixtures thereof.

In some embodiments, the acid driven corrosion may be controlled by adding masking or trapping agents such as amino acid, urea, amides, alcohol, or any combination thereof to the treatment fluid. These corrosion control additives minimize the generation of free acid and therefore as long as the pH of the fluid is in between about 6 to about 7.5, the overall corrosivity of the fluid may be negligible. However, when ammonium bifluoride or another fluoride source having a $pK_a$ within 2 to 3 $pK_a$ units of the equilibrium pH of the HF/F acid/base pair ($pK_a$=3.15) is used, the overall mass of free fluoride in an aqueous medium can render the fluid pH sufficiently acidic (pH<6), therefore requiring an acid corrosion inhibitor. FIG. 1 represents the distribution of HF species as a function of the pH of the solution at room temperature with a 50:50 distribution between HF and $F^-$ at pH=$pK_a$=3.15.

In embodiments, the corrosion inhibitor, and/or corrosion inhibitor intensifier, and/or masking agents are added after the start of the descaling treatment. For example, the treatment fluid including a molar ratio of fluoride containing source to ester of 5:1 to 5:4 may be pumped first, and then the corrosion inhibitor and/or corrosion inhibitor intensifier and/or masking agents are added to the treatment fluid. The volume of treatment fluid pumped prior to the addition of the corrosion inhibitor and/or corrosion inhibitor intensifier and/ or masking agents to the treatment fluid may be a quarter of the wellbore volume, half of the wellbore volume, three quarter of the wellbore volume, or a full volume of the wellbore volume, for example. In some conditions, it may be necessary to increase the treatment fluid residence time in the wellbore. In such situational operations but also in other cases, the treatment fluid may be in contact with the metallic parts of the tubing and/or pumping equipment for such an extended period of time that a corrosion inhibitor may need to be added into the treatment fluid before pumping downhole and/or after starting to pump the treatment fluid downhole. Further operational conditions may make it necessary to increase the treatment fluid residence time in the wellbore, while in contact with the scale and the tubing and with any other metallurgical element, therefore requiring the corrosion inhibitor and intensifier to be included in the treatment fluid before pumping it into the wellbore.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, chelating agents, complexing agents, sequestering agents, iron control agents, scale inhibitors, where the use of polyhydroxycarboxylic acids, aminopolycarboxylic acids, phosphonic acids and strongly coordinating ligands capable of stabilizing multivalent cations (transition metals and main group of valence equal or greater than 2) such as N,N'-bis(carboxymethyl) glycine (NTA), L-glutamic acid N,N-diacetic acid and its sodium salts such as mono-, di-, tri- and, -tetra sodium salt (GLDA), HEDTA (N-hydroxyethyl-ethylenediamine-triacetic acid), hydroxyaminocarboxylic acid (HACA), hydroxyethyleneiminodiacetate (HEIDA), β-alanine diacetic acid (β-ADA), ethylenediaminedisuccinic acid, S,S-ethylenediaminedisuccinic acid (EDDS), polyamino disuccinic acids, N-methyliminodiacetic acid (MIDA), iminodiacetic acid (IDA), N-(2-acetamido)iminodiacetic acid (ADA), a sulfonated iminodialkanoic acid, or alternatively other chelating agents that have lower solubility characteristics in high acid concentrations or strength but are applicable for use in near circumneutral pH to slightly alkaline conditions as those of the treatment fluid herein such as, 1,2-cyclohexanediaminetetraacetic acid (CDTA), diethylenetriamineepentaacetic acid (DTPA),N-t ris[(1,2-dicarboxyethoxy)ethyl]amine (TCA6), N-bis[2-(carboxymethoxy) ethyl]glycine (BCA3), N-bis[2-(1,2-dicarboxyethoxy)ethyl] glycine (BCA6), N-bis[2-(1,2-dicarboxyethoxy)ethyl] aspartic acid (BCA5), N-bis[2-(methylcarboxymethoxy) ethyl]glycine (MCBA3), N-bis[2-(1,2-dicarboxyethoxy) ethyl]methylglycineethanol-diglycinic acid (EDG), ethylenediaminetetraacetic acid (EDTA), N-[2-(3-hydroxysuccinyl)]-L-serine, hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N"'-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, gluconic acid, glucaric acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid including any salt, derivative, or combination thereof, illustrative phosphonate chelating agents can be or include, but is not limited to, N-(phosphonomethyl)iminodiacetic acid (PMIDA), aminomethylphosphonic acid (AMPA), Hydroxyethylamino dimethylene phosphonic acid (HEMPA), vinylphosphonic acid, dimethyl methylphosphonate (DMMP), 1-hydroxyethylidene-1,1-diphosphonic acid (HEDP), 2-Hydroxy phosphonoacetic Acid (HPAA), aminotris (methylenephosphonic acid) (ATMP), Pentapotassium salt [Nitrilotris(methylene)]trisphosphonic acid N-oxide, ethylenediaminetetra (methylenephosphonic acid) (EDTMP), tetramethylenediaminetetra (methylenephosphonic acid) (TDTMP), hexamethylenediaminetetra (methylenephosphonic acid) (HDTMP), diethylenetriaminepenta (methylenephosphonic acid) (DTPMP), phosphonobutanetricarboxylic acid (PBTC), 2-carboxyethyl phosphonic acid (*CEPA*), 2-hydroxyphosphonocarboxylic acid (HPAA), aminotris (methylenephosphonic acid) (AMP), N,N-bis (phosphonomethyl)glycine (BPMG), potassium salt of hexamethylenediamine tetra (methylene phosphonic acid (HMDTMPA), partially neutralized sodium salt of bis hexamethylene triamine pentamethylene phosphonic acid (BHMTPH), a salt thereof, a hydrate thereof, an acid thereof, an ester thereof, a derivative thereof, or any combination thereof, a polymer thereof, a salt thereof, a hydrate thereof, an acid thereof, an ester thereof, a derivative thereof, or any combination thereof, and sodium hexametaphosphate (SHMP).

Other examples of additives include foaming agents, defoaming agents, antifoaming agents, salts, acids, fluid loss control additives, gas, catalysts, clay control agents, clay stabilizers, dispersants, flocculants, scavengers ($H_2S$ scavengers, $CO_2$ scavengers, or $O_2$ scavengers, for example), gelling agents, lubricants, friction reducers, bridging agents, viscosifiers, weighting agents, solubilizers, pH control agents (e.g., buffers), particularly for reservoirs that do not naturally produce hydrocarbon fluids (i.e. oil and gas) or where water-based fluids are injected into such reservoirs. Alternatively, other applicable additives that confer beneficial or additive characteristics to the treatment fluid include emulsifying agents, de-emulsifying agents, proppants or other particulates, particulate diverters, hydrate inhibitors, consolidating agents, bactericides, catalysts breakers, delayed release breakers, and the like. Combinations of these additives may be used as well. One of ordinary skills in the art will be able to formulate a treatment fluid having properties suitable for a given application.

In other various embodiments, the systems configured for delivering the treatment fluid of the present disclosure to a downhole location are described. In various embodiments, the systems can comprise a pump fluidly coupled to a tubular with the tubular containing the treatment fluid. The pump may be a high-pressure pump in some embodiments. As used herein, the term "high-pressure pump" will refer to a pump that is capable of delivering a fluid downhole at a pressure of about 1000 psi or greater. A high-pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high-pressure pump, or they may be introduced following a treatment fluid that was introduced with a high-pressure pump. In some embodiments, the high-pressure pump may be capable of fluidly conveying particulate matter into the subterranean formation. Suitable high-pressure pumps will be known to one having ordinary skills in the art and may include, but are not limited to, floating piston pumps and positive displacement pumps.

In other embodiments, the pump may be a low-pressure pump. As used herein, the term "low-pressure pump" will refer to a pump that operates at a pressure of less than about 1000 psi. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of a treatment fluid before it reaches the high-pressure pump. Alternately, the low-pressure pump may be used to directly introduce the treatment fluid to the subterranean formation.

In some embodiments, the systems described herein can further comprise a mixing tank that is upstream of the pump and in which the pressure-mitigating material is formulated with a carrier fluid. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
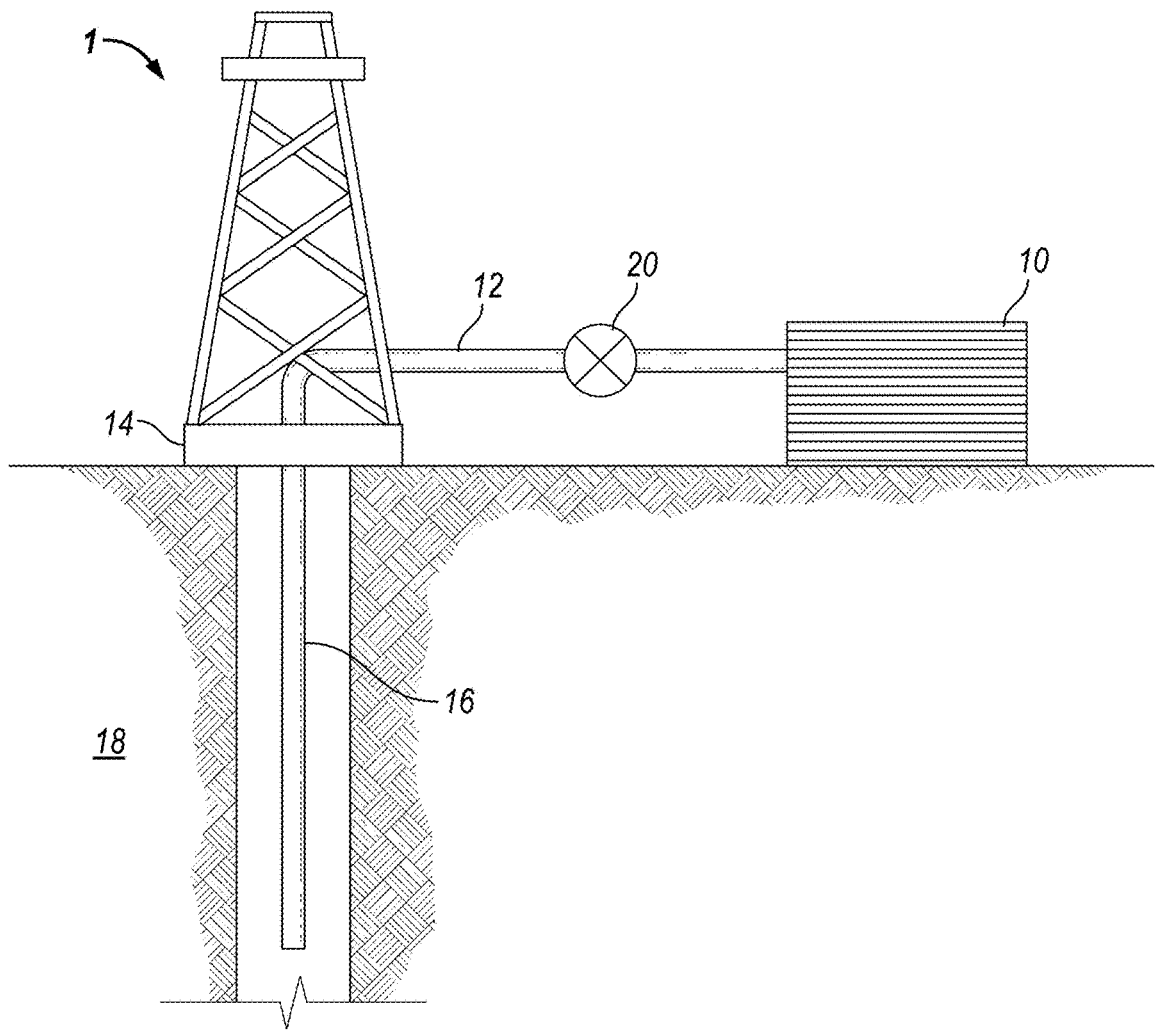
FIG. 2 shows an illustrative schematic of a system that can deliver treatment fluids of the present disclosure to a downhole location according to embodiments of the present disclosure.

FIG. 2 shows an illustrative schematic of a system that can deliver treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, coiled tubing and spools, co-flex pipe, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18. In other embodiments, the treatment fluid is allowed to react, spent downhole, and is not flowed back to surface immediately or within days of concluding the treatment. Under such conditions, it is beneficial to include the necessary additives into the treatment fluid that stabilize the spent fluid.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

The systems and methods for removing geothermal scale formed from a source of geothermal fluid do not use any activator, breaker, or oxidizer. Further, the systems and methods have a range of pH that impacts the corrosion inhibition of the treatment fluid in contact with metal components, are safer to handle (especially as compared to system with pH below 4), minimize waste generation, and are optimal for scale dissolution. The systems and methods may comprise any of the various features disclosed herein, comprising one or more of the following statements.

Statement 1. A method comprising method for treating geothermal wells comprising: introducing a treatment fluid into a wellbore of a geothermal well having geothermal scale, wherein the treatment fluid comprises an ester, a fluoride-containing source, and a base fluid, wherein a molar ratio of fluoride-containing source to ester is about 1:1 to about 5:1; contacting the geothermal scale with the treatment fluid; and removing at least a portion of the geothermal scale from the geothermal well using the treatment fluid.

Statement 2. The method of Statement 1, the fluoride containing source is selected from the group of fluoride containing source consisting of hydrofluoric acid, ammonium fluoride, ammonium bifluoride, potassium bifluoride, sodium bifluoride, fluorophosphoric acid, sodium hexafluorophosphate, boron trifluoride, and any combination thereof.

Statement 3. The method of Statement 1 or Statement 2, wherein the ester is selected from the group of esters consisting of formate, acetate, lactate, oxalate, citrate, polylactide, lactone, and any combination thereof.

Statement 4. The method of any of Statements 1 to 3, wherein the ester is selected from the group of esters consisting of ethylene glycol monoformate, ethylene glycol diformate, diethylene glycol diformate, glyceryl monoformate, glyceryl diformate, glyceryl triformate, triethylene glycol diformate, formate esters of pentaerythritol, methyl lactate, ethyl lactate, propane-1,2,3-triyl triacetate, glycerol triacetate, flycerin triacetate, 1,2,3-triacetylglycerol, 1,2,3-triacetoxypropane, and any combination thereof.

Statement 5. The method of any of Statements 1 to 4, wherein the ester is selected from the group of esters consisting of oxetan-2-one (β-lactone), oxolan-2-one (γ-lactone), oxan-2-one (δ-lactone), oxepan-2-one (ε-lactone), polyglycolides, their derivatives, and any combinations thereof.

Statement 6. The method of any of Statements 1 to 5, wherein the ester has a concentration from 1 mol/L to about 5 mol/L.

Statement 7. The method of any of Statements 1 to 6, wherein the ester has a concentration from 1 mol/L to about 3.5 mol/L.

Statement 8. The method of any of Statements 1 to 7, wherein the fluoride containing source has a concentration from 1 mol/L to about 5 mol/L.

Statement 9. The method of any of Statements 1 to 8, wherein the fluoride containing source has a concentration from 3 mol/L to about 5 mol/L.

Statement 10. The method of any of Statements 1 to 9, wherein the molar ratio of fluoride-containing source to ester is about 1:1 to about 3.125:1.

Statement 11. The method of any of Statements 1 to 10, wherein the treatment fluid further comprises a corrosion inhibitor.

Statement 12. The method of any of Statements 1 to 11, wherein the treatment fluid further comprises at least one corrosion inhibitor selected from the group of corrosion inhibitors consisting of cinnamaldehyde, benzaldehyde, crotonaldehyde and its Mannich bases, quaternized heterocycles, and any combination thereof.

Statement 13. The method of any of Statements 1 to 12, wherein the treatment fluid further comprises at least one corrosion inhibitor intensifier selected from the group of corrosion inhibitor intensifiers consisting of phosphorous salts, iodide salts, salts of antimony, salts of bismuth, oxo-coordinated complexes, diacids, halides, sulfides, selenides, phosphides, nitrites, nitrates, and any combination thereof.

Statement 14. The method of any of Statements 1 to 13, wherein the base fluid is ammonium chloride.

Statement 15. The method of any of Statements 1-14, wherein the treatment fluid has a pH from about 6 to about 8.

Statement 16. A method for treating geothermal wells comprising: introducing a treatment fluid into a wellbore of a geothermal well, wherein the treatment fluid comprises an ester, a fluoride-containing source, and a base fluid, wherein a molar ratio of fluoride-containing source to ester is about 1:1 to about 5:1, and wherein the geothermal well has geothermal scale and a bottomhole temperature from about 350 F to about 600 F; contacting the geothermal scale with the treatment fluid; removing at least a portion of the geothermal scale from the geothermal well using the treatment fluid; mixing a corrosion inhibitor to the treatment fluid at surface; and pumping the treatment fluid comprising a corrosion inhibitor downhole.

Statement 17. The method of Statement 16, wherein introducing the treatment fluid into the wellbore of the geothermal well comprises pumping a quarter of a volume of the wellbore of the geothermal well.

Statement 18. The method of any of Statement 16 or Statement 17, wherein the molar ratio of fluoride-containing source to ester is about 1:1 to about 3.125:1.

Statement 19. The method of any of Statements 16-18, wherein the ester has a concentration from 1 mol/L to about 3.5 mol/L.

Statement 20. A method of matrix acidizing comprising: introducing a treatment fluid into a wellbore of a formation, wherein the treatment fluid comprises an ester, a fluoride-containing source, and a base fluid, wherein a molar ratio of fluoride-containing source to ester is about 1:1 to about 5:1; contacting the formation with the treatment fluid; and improving a permeability of the formation using the treatment fluid.

To facilitate a better understanding of the present invention, the following examples of certain aspects of some embodiments are given. In no way should the following examples be read to limit, or define, the entire scope of the disclosure.

Examples

Figure 3:
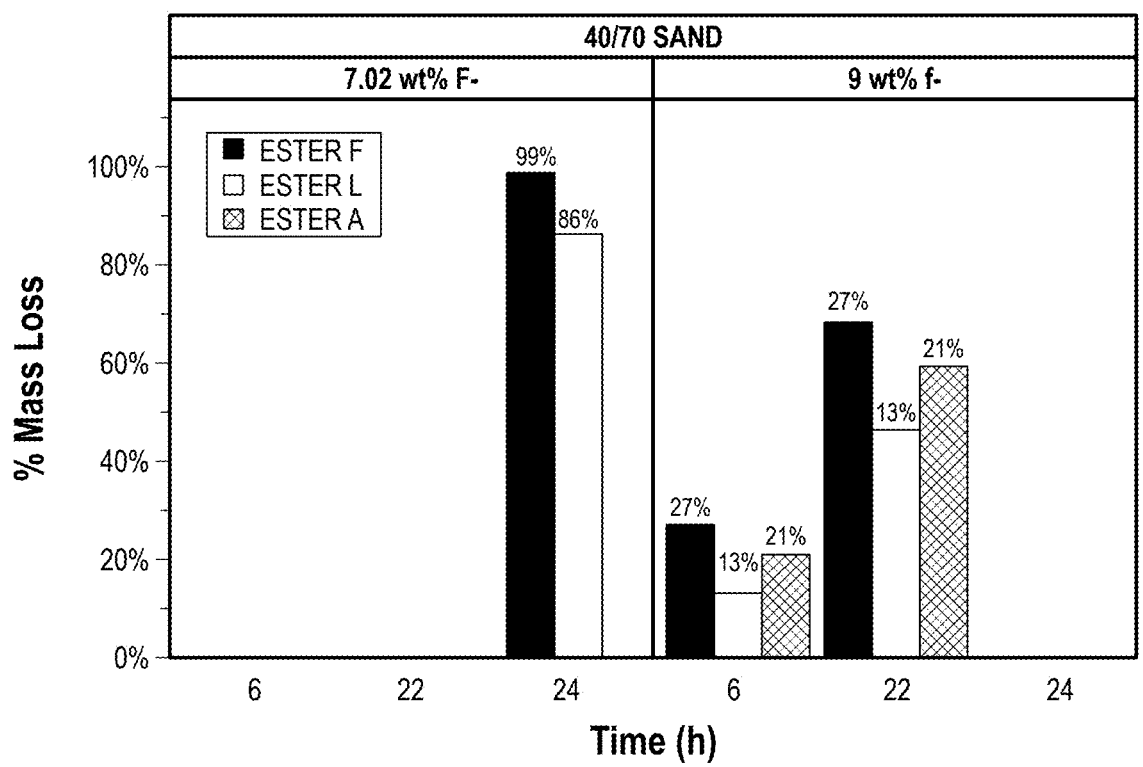
FIG. 3 are scale dissolution evaluation tests for treatment fluids according to embodiments of the present disclosure.
Figure 4:
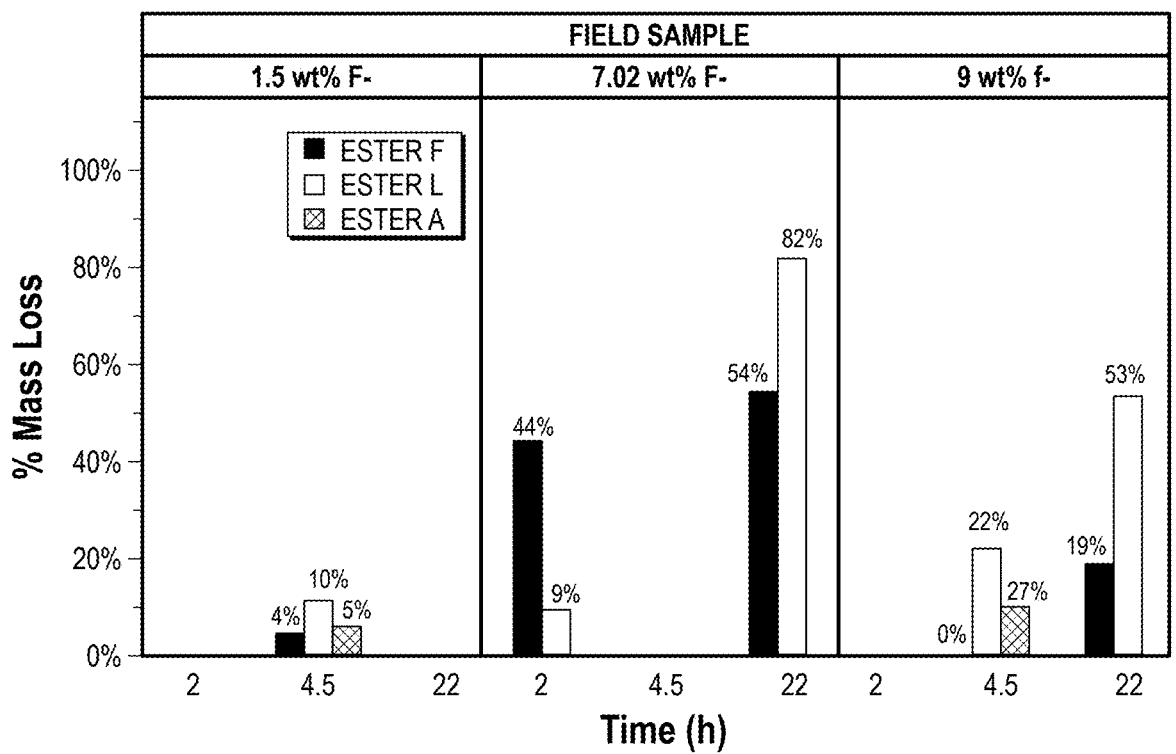
FIG. 4 are scale dissolution evaluation tests for treatment fluids according to embodiments of the present disclosure.

Scale dissolution evaluation tests were performed on quartz 40/70 mesh sand in FIG. 3 and an amorphous (per XRD analysis) geothermal wellbore scale sample comprising 80% $SiO_2$, 10% $Al_2O_3$ and 3% $K_2O$, 3% CaO, and 3% $Fe_2O_3$ and minor constituents of magnesium and titanium oxides in FIG. 4. Comparisons with treatment fluids comprising fluoride/ester formate (Ester F), fluoride/ester lactate (Ester L), and fluoride/ester acetate (Ester A) were conducted. Ester F corresponds to the ester generating formic acid from diethylene glycol diformate. Ester L corresponds to the ester generating lactic acid from methyl lactate or ethyl lactate. Ester A corresponds to the ester generating acetic acid from propane-1,2,3-triyl triacetate or triacetin.

In the following scale dissolution evaluation tests, the same volumetric ratios were used, but the total volume or testing conditions were different. The initial mass of the 40/70 sand (representing quartz) for the scale dissolution evaluation test was 1 g. The mass to volume ratio for the scale dissolution tests was 0.2. When the geothermal scale was employed a mass to volume ratio of 0.01 was used.

The source of fluoride ($F^-$) was 36 wt. % ammonium fluoride (AF) with the volumes of ammonium fluoride (AF) as described in Table 1 below:

TABLE 1

Volume of 36% wt/v Ammonium Fluoride, Corresponding Mass, and Corresponding Mole per Liter of Fluoride.

| Volume of AF (mL) | corresponding mass (g) | $F^-$ (wt. %) | $F^-$ (mol/L) |
|---|---|---|---|
| 93.6 | 103 | 2.0 | 1.0 |
| 187.3 | 188.3 | 4.1 | 2.0 |
| 280.9 | 309 | 6.0 | 3.0 |
| 374.5 | 412 | 8.0 | 4.0 |
| 467.3 | 514 | 10.0 | 5.0 |

The loading of fluoride is important to achieve the greatest silica and/or aluminosilicate scale dissolution. Therefore, high loading may be used but lower loading may also be used by adjusting the water and ester proportions. In some embodiments, the fluoride loading may be 7.0 mol/L or 13% w/v and the fluoride($F^-$)/ester molar ratios may be $F^-$/Ester F of 3:1, F/Ester L molar ratio of 4:1, and $F^-$/Ester A molar ratio of 2:1, for example. For the purpose of demonstrating the dissolution capacity of the combination of the mixture, the ester was combined with ammonium fluoride in a ratio that gives the maximum fluoride concentration that is operationally and logistically applicable and manageable. The maximum ratio of fluoride to ester (formate or Ester F, lactate or Ester L, or acetate or Ester A) is based on 5.0 moles/L of fluoride. Volumetrically, using nearly half (467 mL or L) of ammonium fluoride is equivalent to 10.0 wt % of HF (eq. 9.53 wt % $F^-$), or 5.0 mol/L of fluoride.

Ester F, Ester L, and Ester A were mixed with the respective volume of ammonium fluoride (AF) in Table 1 to yield a $F^-$/ester molar ratios of 5:5, 5:3, 5:3.15, 5:2.4, and 5:1.6, respectively. Table 1 below corresponds to a dissolution mixture that contains ammonium fluoride equivalent to a fluoride concentration of 6.78 mol/L (12.89% w/v) with Ester F (45 mL) and water to achieve such fluoride concentration. The water and ester ratios are variable and in these examples are chosen to represent the minimum usable amount of water, which is the dilution and carrier medium. The ester loading in conjunction with the ammonium fluoride provides additional water after hydrolysis and reaction, respectively. The total volume in this example is 131.1 mL, which can be adjusted to a unitary basis such as 100 or 1000. The following mixture of fluoride containing source to ester were tested for Ester F, Ester L, and Ester A to dissolve 1 g. of quartz 40/70 mesh sand in a total volume of 131.1 mL:

TABLE 2

Treatment Fluid Mixtures Used For The Dissolution Test Shown In FIG. 3.

| Molecule | Volume | Weight |
|---|---|---|
| Ammonium Fluoride | 71.1 mL | 54% v/v |
| Ester | 45 mL | 34% v/v |
| Water | 15 mL | 11% v/v |

The amount of quartz loss as a function of time for Ester F, Ester L, Ester A for 2 different ratios of fluoride to ester is plotted in FIG. 3.

FIG. 3 provides the testing results with 1 g of the quartz 40/70 mesh sand which was dissolved in 131.1 mL of treatment fluid using 7.02 wt. % of $F^-$ (3.5 mol/L fluoride) using ammonium bifluoride as $F^-$ source mixed with 34% w/v of Ester F. 99% of the 40/70 sand was dissolved after 24 hours. 2.5 g of ammonium bifluoride were used per 25 mL of solution. 7.02 wt % of HF corresponds to 3.5 mol/L of F (6.66% Fluoride), which gives a $F^-$/Ester F molar ratio equal to 1.3; a F/Ester L molar ratio of 1.0; a F/Ester A molar ratio of 1.9.

86% of the 1 g of the (I) quartz 40/70 mesh sand was dissolved in 131.1 mL using 7.02 wt. % of $F^-$ using ammonium bifluoride as $F^-$ source mixed with 34% of Ester L after 24 hours.

69% of the 1 g of the (I) quartz 40/70 mesh sand was dissolved in 131.1 mL using 8.56 wt % $F^-$ (labelled 9 wt. % of $F^-$ in FIG. 3) using ammonium fluoride as $F^-$ source mixed with 34% of Ester F after 22 hours. 8.56 wt % of F gives a $F^-$/Ester F molar ratio equal to 2.7; a F/Ester L molar ratio of 3.6; a $F^-$/Ester A molar ratio of 1.8.

60% of the 1 g of the quartz 40/70 mesh sand was dissolved in 131.1 mL using 8.56 wt. % of $F^-$ using ammonium fluoride as $F^-$ source mixed with 34% of Ester A after 22 hours.

46% of the 1 g of the quartz 40/70 mesh sand was dissolved in 131.1 mL using 8.56 wt. % of $F^-$ using ammonium fluoride as $F^-$ source mixed with 34% of Ester L after 22 hours.

27% of the 1 g of the quartz 40/70 mesh sand was dissolved in 131.1 mL using 8.56 wt. % of $F^-$ using ammonium fluoride as $F^-$ source mixed with 34% of Ester F after 6 hours.

21% of the 1 g of the quartz 40/70 mesh sand was dissolved in 131.1 mL using 8.56 wt. % of $F^-$ using ammonium fluoride as $F^-$ source mixed with 34% of Ester A after 6 hours.

13% of the 1 g of the quartz 40/70 mesh sand was dissolved in 131.1 mL using 8.56 wt. % of $F^-$ using ammonium fluoride as $F^-$ source mixed with 34% of Ester L after 6 hours.

The amount of geothermal wellbore scale sample (labelled Field Sample in FIG. 4) loss as a function of time for Ester F, Ester L, Ester A for 3 different ratios of hydrofluoric acid to ester is plotted in FIG. 4.

8.56 wt % of F gives a $F^-$/Ester F molar ratio equal to 2.7; a $F^-$/Ester L molar ratio of 3.6; a F/Ester A molar ratio of 1.8, respectively.

53% of the 1 g of the field scale sample was dissolved in 131.1 mL using 8.56 wt. % of $F^-$ using ammonium fluoride as $F^-$ source mixed with 34% of Ester L after 22 hours.

19% of the 1 g of the field scale sample was dissolved in 131.1 mL using 8.56 wt. % of F⁻ using ammonium fluoride as F⁻ source mixed with 34% of Ester F after 22 hour.

22% of the 1 g of the field scale sample was dissolved in 131.1 mL using 8.56 wt. % of F⁻ using ammonium fluoride as F⁻ source mixed with 34% of Ester L after 4.5 hour.

10% of the 1 g of the field scale sample was dissolved in 131.1 mL using 8.56 wt. % of F using ammonium fluoride as F⁻ source mixed with 34% of Ester A after 4.5 hour.

0% of the 1 g of the field scale sample was dissolved in 131.1 mL using 8.56 wt. % of F⁻ using ammonium fluoride as F⁻ source mixed with 34% of Ester F after 4.5 hour.

7.02 wt % of HF corresponds to 3.5 mol/L of F (6.66% Fluoride), which gives a F/Ester F molar ratio equal to 1.3; a F/Ester L molar ratio of 1.0; a F/Ester A molar ratio of 1.9, respectively.

82% of the 1 g of the field scale sample was dissolved in 131.1 mL using 7.02 wt. % of F⁻ using ammonium fluoride as F⁻ source mixed with 34% of Ester L after 22 hours.

54% of the 1 g of the field scale sample was dissolved in 131.1 mL using 7.02 wt. % of F⁻ using ammonium fluoride as F⁻ source mixed with 34% of Ester F after 22 hours.

44% of the 1 g of the field scale sample was dissolved in 131.1 mL using 7.02 wt. % of F using ammonium fluoride as F⁻ source mixed with 34% of Ester F after 2 hours.

9% of the 1 g of the field scale sample was dissolved in 131.1 mL using 7.02 wt. % of F⁻ using ammonium fluoride as F⁻ source mixed with 34% of Ester L after 2 hours.

10% of the 1 g of the field scale sample was dissolved in 131.1 mL using 1.43 wt % F⁻ (labelled 1.5 wt. % of F⁻ in FIG. 4) using ammonium fluoride as F⁻ source mixed with 34% of Ester L after 4.5 hours. F⁻/Ester L molar ratio of 0.32 is indicative of the lower dissolution capacity of this treatment fluid composition.

5% of the 1 g of the field scale sample was dissolved in 131.1 mL using 1.43 wt. % of F⁻ using ammonium fluoride as F⁻ source mixed with 34% of Ester A after 4.5 hours. F/Ester L molar ratio of 0.20 is indicative of the lower dissolution capacity of this treatment fluid composition.

4% of the 1 g of the field scale sample was dissolved in 131.1 mL using 1.43 wt. % of F⁻ using ammonium fluoride as F⁻ source mixed with 34% of Ester F after 4.5 hours. F/Ester L molar ratio of 0.41 is indicative of the lower dissolution capacity of this treatment fluid composition.

Figure 5:
FIG. 5 is a corrosion test immersing a metal coupon in a treatment fluid according to embodiments of the present disclosure.

FIG. 5 is a corrosion test immersing a metal coupon used for coiled tubing GT-90, which can withstand 9,000 psi. The metal coupon was immersed for 6 hours at 400 F (204° C.) in the following treatment fluid in a total volume of 218.5 mL:

TABLE 3

Treatment Fluid Mixtures Used For The Corrosion Test.

| Molecule | Volume | Weight |
| --- | --- | --- |
| Ammonium Fluoride | 118.5 mL | 54% |
| Ester | 75 mL | 34% |
| Water | 25 mL | 11% |

A molar ratio of ammonium fluoride to Ester L of 5:3.15 was used along with one commercially available corrosion inhibitor A and one commercially available corrosion inhibitor B. Corrosion inhibitor A is a reaction product of aromatic ketone, aldehyde, and formaldehyde with a fatty amine, and corrosion inhibitor B is a mixture of poly quaternary ammonium salt with polynuclear heteroaromatic compound in alcoholic and aromatic solvents. The loading of corrosion inhibitor A and corrosion inhibitor B is 0.25% (2.5 gal/1000 gal or gpt) respectively, for a combined loading of 0.5% v/v of corrosion inhibitor Only 0.151 g of metal coupon were lost, which corresponds to a corrosion loss of 0.0116 lb/ft² for 6 hours at 400 F (204° C.). It is noteworthy that the corrosion mass loss rate at this temperature-time condition and for the metallurgy is lower than 0.02 lbm/ft², which is the preferred metric for coiled tubing metallurgy. Further, the concentration of total fluoride contacting the metal is far beyond the normally accessible for any type of fluoride-containing treatment fluid.

As it is impracticable to disclose every conceivable embodiment of the technology described herein, the figures, examples, and description provided herein disclose only a limited number of potential embodiments. One of ordinary skills in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skills in the art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment-which may be implemented in addition to, in conjunction with, or in place of an embodiment of a similarly-named component described for any other figure.

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" may be used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase "operatively connected" may refer to a direct connection (e.g., a direct wired or wireless connection between devices) or an indirect connection (e.g., multiple wired and/or wireless connections between any number of other devices connecting the operatively connected devices).

What is claimed is:

1. A method for treating geothermal wells comprising:
   introducing a treatment fluid into a wellbore of a geothermal well having geothermal scale,
       wherein the treatment fluid comprises an ester, a fluoride-containing source, and a base fluid, wherein a molar ratio of fluoride-containing source to ester is about 1:1 to about 5:1, wherein the ester comprises methyl lactate, and wherein the fluoride-containing source comprises hydrofluoric acid;
   contacting the geothermal scale with the treatment fluid; and
   removing at least a portion of the geothermal scale from the geothermal well using the treatment fluid.

2. The method of claim 1, wherein the ester has a concentration from 1 mol/L to about 5 mol/L.

3. The method of claim 1, wherein the ester has a concentration from 1 mol/L to about 3.5 mol/L.

4. The method of claim 1, wherein the fluoride containing source has a concentration from 1 mol/L to about 5 mol/L.

5. The method of claim 1, wherein the fluoride containing source has a concentration from 3 mol/L to about 5 mol/L.

6. The method of claim 1, wherein the molar ratio of fluoride-containing source to ester is about 1:1 to about 3.125:1.

7. The method of claim 1, wherein the treatment fluid further comprises a corrosion inhibitor.

8. The method of claim 1, wherein the treatment fluid further comprises at least one corrosion inhibitor comprising crotonaldehyde and its Mannich bases.

9. The method of claim 1, wherein the treatment fluid further comprises at least one corrosion inhibitor intensifier comprising phosphorous salts.

10. The method of claim 1, wherein the base fluid comprises ammonium chloride.

11. The method of claim 1, wherein the treatment fluid has a pH from about 6 to about 8.

12. A method for treating geothermal wells comprising:
    introducing a treatment fluid into a wellbore of a geothermal well,
        wherein the treatment fluid comprises an ester, wherein the ester comprises methyl lactate a fluoride-containing source, wherein the fluoride-containing source comprises hydrofluoric acid, and a base fluid, wherein a molar ratio of fluoride-containing source to ester is about 1:1 to about 5:1, and
        wherein the geothermal well has geothermal scale and a bottomhole temperature from about 350° F. to about 600° F.;
    contacting the geothermal scale with the treatment fluid;
    removing at least a portion of the geothermal scale from the geothermal well using the treatment fluid;
    mixing a corrosion inhibitor to the treatment fluid at surface; and
    pumping the treatment fluid comprising a corrosion inhibitor downhole.

13. The method of claim 12, wherein introducing the treatment fluid into the wellbore of the geothermal well comprises pumping a quarter of a volume of the wellbore of the geothermal well.

14. The method of claim 12, wherein the molar ratio of fluoride-containing source to ester is about 1:1 to about 3.125:1.

15. The method of claim 12, wherein the ester has a concentration from 1 mol/L to about 3.5 mol/L.

16. A method of matrix acidizing comprising:
    introducing a treatment fluid into a wellbore of a formation,
        wherein the treatment fluid comprises an ester, a fluoride-containing source, at least one corrosion inhibitor comprising crotonaldehyde and its Mannich bases, and a base fluid, wherein a molar ratio of fluoride-containing source to ester is about 1:1 to about 5:1;
    contacting the formation with the treatment fluid; and
    improving a permeability of the formation using the treatment fluid.

* * * * *